United States Patent [19]
Terauchi

[11] Patent Number: 5,259,736
[45] Date of Patent: Nov. 9, 1993

[54] SWASH PLATE TYPE COMPRESSOR WITH SWASH PLATE HINGE COUPLING MECHANISM

[75] Inventor: Kiyoshi Terauchi, Isesaki, Japan
[73] Assignee: Sanden Corporation, Gunma, Japan
[21] Appl. No.: 992,734
[22] Filed: Dec. 18, 1992

[30] Foreign Application Priority Data

Dec. 18, 1991 [JP] Japan .................. 3-335076

[51] Int. Cl.⁵ .............................. F04B 1/26
[52] U.S. Cl. ................... 417/222.1; 74/60; 417/270
[58] Field of Search ........... 74/60; 417/222.1, 222.2, 417/270

[56] References Cited

U.S. PATENT DOCUMENTS

| | | | |
|---|---|---|---|
| 3,062,020 | 11/1962 | Heindorn | 417/222 |
| 3,861,829 | 1/1975 | Roberts et al. | 417/53 |
| 4,077,269 | 3/1978 | Hodgkinson | 74/60 |
| 4,175,915 | 11/1979 | Black et al. | 417/222 |
| 4,229,144 | 10/1980 | Kass et al. | 417/222.1 |
| 4,381,647 | 5/1983 | Russeff | 417/222.1 |
| 4,425,837 | 1/1984 | Livesay | 92/71 |
| 4,433,596 | 2/1984 | Scalzo | 74/839 |
| 4,448,154 | 5/1984 | Kossel | 74/60 |
| 4,664,604 | 5/1987 | Terauchi | 417/222 |
| 4,674,957 | 6/1987 | Ohta et al. | 417/222 |
| 4,727,761 | 3/1988 | Scalzo | 74/60 |
| 4,782,712 | 11/1988 | Takahashi et al. | 74/60 |
| 4,872,815 | 10/1989 | Takai | 417/222 |
| 4,884,952 | 12/1989 | Kanamaru et al. | 417/222.2 |
| 4,886,423 | 12/1989 | Iwanami et al. | 417/222.2 |
| 5,055,004 | 10/1991 | Ebbing et al. | 417/222.2 |

FOREIGN PATENT DOCUMENTS

| | | | |
|---|---|---|---|
| 104324 | 11/1990 | Japan | 417/222.1 |
| 197708 | 8/1977 | U.S.S.R. | 417/222.1 |

Primary Examiner—Richard A. Bertsch
Assistant Examiner—Peter Korytnyk
Attorney, Agent, or Firm—Baker & Botts

[57] ABSTRACT

A swash plate type compressor with a variable displacement mechanism is disclosed. The compressor includes a compressor housing having a cylinder block provided with a plurality of cylinders and a crank chamber. A piston is slidably fitted within each of the cylinders and is reciprocated by a drive mechanism. The drive mechanism includes a drive shaft rotatably supported by the compressor housing, a pair of rotor plates fixed on the drive shaft and a swash plate having a surface with an adjustable incline angle or tilt. The rotor plates are arranged on opposite sides of the swash plate. The swash plate converts the rotating motion of the drive shaft into the reciprocating motion of the pistons which are coupled to the swash plate through bearings. A pair of hinge coupling mechanisms hingedly connect an arm portion of the swash plate to an arm portion of each of the rotor plates to permit variations in the incline angle or tilt of the swash plate. The two hinge coupling mechanisms include two arm portions extending from opposite sides of the swash plate and an arm portion extending from each of the two rotor plates. The combination and arrangement of the two hinge coupling mechanisms on opposite sides of the swash plate reduces gas compression reaction forces acting thereon so that wear and deterioration thereof can be prevented to thereby increase the life of the compressor and enable effective control of the capacity of the compressor through adjustments in the incline angle or tilt of the swash plate.

6 Claims, 4 Drawing Sheets

SWASH PLATE TYPE COMPRESSOR WITH SWASH PLATE HINGE COUPLING MECHANISM

BACKGROUND OF THE INVENTION

1. Field of the Invention

The present invention relates to a variable displacement swash plate compressor which is particularly suitable as a refrigerant compressor for an automotive air-conditioning apparatus.

2. Description of the Invention

A swash plate refrigerant compressor with a variable displacement mechanism suitable for use in an automotive air conditioning system is disclosed in U.S. Pat. No. 4,963,074. As disclosed therein, a swash plate is supported on a rotatable shaft of the compressor so that a change in inclination angle or tilt of the slant plate causes the reciprocating stroke or stroke length of each piston to change. The swash plate is connected with a rotor plate rotatably supported on the rotatable shaft through a single hinge coupling mechanism so that the swash plate and rotor plate rotate in unison.

The hinge coupling mechanism includes a first arm portion projecting axially from an outside surface of the rotor plate and a second arm portion projecting from the swash plate toward the first arm portion. The first and second arm portions overlap each other and are connected to one another by a guide pin which extends into a rectangular shaped hole or slot formed through the first arm portion and a pin hole formed through the second arm portion. Referring to FIG. 4, a hinge coupling mechanism of the above type is illustrated in cross section. As shown therein, the first arm portion and second arm portion are slidably connected with one guide pin and one snap pin through the rectangular hole. In the above compressor, this hinge coupling mechanism is the only hinge coupling mechanism included.

Referring to FIG. 5, the reaction force Fp of a piston in its gas compression state in a cylinder is illustrated as acting against the swash plate and is finally received by the hinge coupling mechanism. Moment Mp is indicated as the product of reaction force Fp and length Lp which is the distance between the ends of the swash plate. The axial force Fh acting on the hinge mechanism is a function of moment Mp since this moment is equal to the moment formed by Fh and the distance Lh between the hinge mechanism and the center of the swash plate. The following equations illustrate the relationship:

$$Mp = Fp \cdot Lp$$

$$Fh \cdot Lh = Mp$$

$$Fh = Lp/Lh \cdot Fp$$

Thus, the magnitude of force Fh is large compared with force Fp since length Lb is small compared with length Lp.

One of the disadvantages of the above compressor is that a large axial force acts on the single hinge coupling mechanism causing excessive wear between the outer peripheral surface of the guide pin and the surface of a rectangular shaped hole or slot of the rotor plate. As a result of this wear and deterioration of the hinge coupling mechanism, capacity control of the compressor is adversely affected and adjustment of piston stroke by adjustment of the angle of inclination or tilt of the swash plate to vary compressor capacity cannot be reliably achieved.

SUMMARY OF THE INVENTION

Accordingly, a first object of the present invention is to provide a variable capacity swash plate compressor having a durable hinge coupling mechanism between the swash plate and rotor plate. The variable capacity swash plate compressor according to the present invention includes a compressor housing enclosing a crank chamber, a suction chamber and a discharge chamber therein. The compressor housing includes a cylinder block having a plurality of cylinders formed therethrough. A piston slidably fits within each of the cylinders. A driving mechanism is coupled to the pistons for reciprocating the pistons within the cylinders. The driving mechanism includes a drive shaft rotatably supported in the housing, a first rotor plate frictionally engaging the drive shaft and a second rotor plate. These rotor plates are each connected to a swash plate by separate hinge coupling mechanisms which are symmetrically disposed.

The hinge coupling mechanisms include arm portions extending from each of the rotor plates and the swash plate. The arm portions of the swash plate are connected with the arm portions of the rotor plates through guide pins. The swash plate is supported for rotational motion with the drive shaft and is connected to the pistons through bearings. Each piston reciprocates within a cylinder upon rotation of the swash plate due to the inclination or tilt of the swash plate. The stroke of the pistons can be changed by changing the angle of inclination or tilt in response to the pressure differences between a crank chamber, a control chamber and a suction chamber. The hinge coupling mechanisms, which facilitate the change in stroke, are arranged with respect to each other to reduce the forces experienced therein during operation of the compressor.

DETAILED DESCRIPTION OF THE PREFERRED EMBODIMENT

Figure 1:
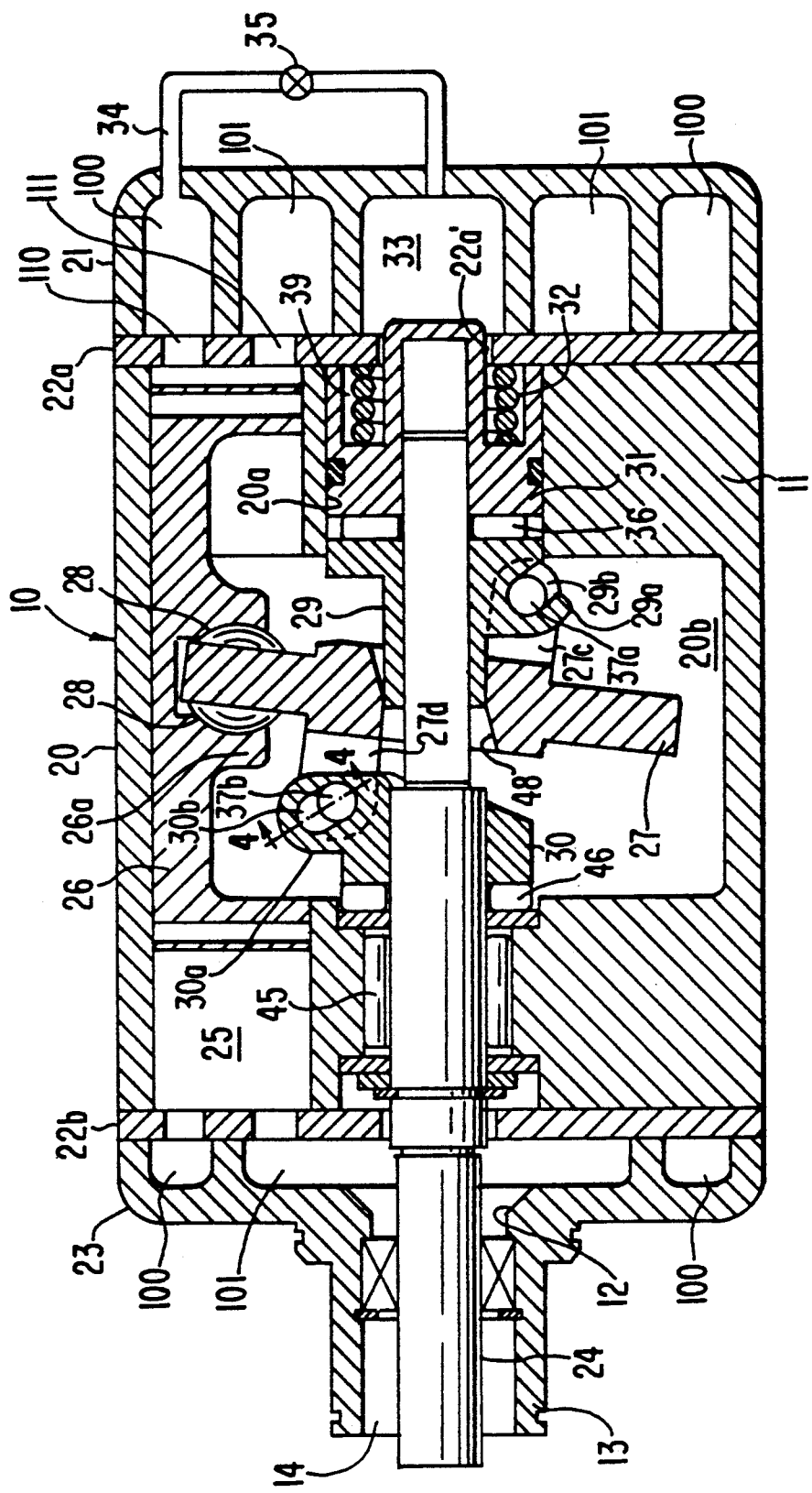
FIG. 1 is a longitudinal sectional view of a swash plate refrigerant compressor with a variable displacement mechanism in accordance with an embodiment of the present invention wherein a swash plate is disposed at a minimum slant or tilt angle.

Referring to FIG. 1, a variable capacity swash plate refrigerant compressor according to this invention is shown. The compressor includes a closed cylinder housing assembly 10 formed by annular casing 20, cylinder block 11, a hollow portion such as crank chamber 20b, front end plate 23 and rear end plate 21.

Front end plate 23 and valve plate 22b are mounted on one end of annular casing 20 to close one end of crank chamber 20b. Front end plate 23 and valve plate 22b are fixed on casing 20 by a plurality of bolts (not shown). Rear end plate 21 and valve plate 22a are mounted on the other end of annular casing 20 by a plurality of bolts (not shown) to cover the other end of cylinder block 11. An opening 12 is formed in front end plate 23 for receiving drive shaft 24. An annular sleeve 13 with interior space 14 projects from the front end surface of front end surface of front end plate 23. Bearing 45, which is disposed within cylinder block 1 1, supports drive shaft 24. The inner end of drive shaft 24 is provided with a first rotor plate 30.

Thrust needle bearing 46 is placed between the inner end surface of front end plate 23 and the adjacent axial end surface of rotor plate 30 to receive the thrust load that acts against rotor plate 30 and to ensure smooth motion. The outer end of drive shaft 24, which extends outwardly from sleeve 13, is driven by the engine of a vehicle through a conventional pulley arrangement.

The inner end of drive shaft 24 extends into second rotor plate 29 and central bore 20a formed in the center of cylinder block 11. Second rotor plate 29 is rotatably supported therein by a bearing such as radial needle bearing 36. The inner end of drive shaft 24 is rotatably supported inside actuator 31 which forms part of a tilt control mechanism. Coil spring 32 abuts one end of actuator 31 and is disposed between actuator 31 and valve plate 22a to push actuator 31 and second rotor plate 29 toward the crank chamber. The recoil strength of coil spring 32 is set to oppose the inner compression of crank chamber 20b. Chamber 39 on the rear side of actuator 31 communicates with control chamber 33 through hole 22a' of valve plate 22a. Movement of actuator 31 is adjustably controlled by the inner gas compression of control chamber 33 which is controlled by pressure control valve 35 of a pressure control system which is in communication with discharge chamber 100.

Second rotor plate 29 includes arm portion 29a projecting axially outwardly from one side surface thereof. Arm portion 29a includes rectangular hole 29b which is positioned obliquely to drive shaft 24. Swash plate 27 includes opening 48 through which drive shaft 24 is disposed. Swash plate 27 also includes first arm portion 27c and second arm portion 27d.

First arm portion 27c projects toward first portion 29a of second rotor plate 29 extending from one side surface thereof. Second arm portion 27d projects toward second arm portion 30a of first rotor plate 30 extending from one side surface thereof.

In accordance with the above construction, swash plate 27 is connected to both rotor plate 29 and rotor plate 30 through separate hinge coupling mechanisms for rotation in unison with rotor plate 29 and rotor plate 30. Pin 37b of one hinge coupling mechanism is slidably disposed in rectangular hole or slot 30b and pin 37a of the other hinge coupling mechanism is disposed in groove or slot 29b. The sliding motion of pin 37a and pin 37b changes the slant angle or tilt of the inclined surface of swash plate 27.

Cylinder block 11 includes a plurality of annularly arranged cylinders 25 into which each piston 26 slides. Each piston 26 is double-headed with a piston portion slidably disposed within each cylinder 25 and connecting portion 26a connecting the piston portions.

Semi-spherical thrust bearings 28 slidably couple swash plate 27 and connecting portion 26a of pistons 26. The rotation of drive shaft 24 causes swash plate 27 to rotate between bearings 28, and as the inclined surface of swash plate 27 moves axially to the right and left relative to the pistons and their respective cylinders, pistons 26 reciprocate within cylinders 25.

Rear end plate 21 is shaped to define suction chamber 101 and discharge chamber 100. Valve plate 22a, which together with rear end plate 21 is fastened to the end of cylinder block 20 by bolts (not shown), is provided with a plurality of valve suction ports 111 connected between suction chamber 101 and respective cylinders 25, and a plurality of valve discharge ports 110 connected between discharge chamber 100 and cylinders 25. Discharge chamber 100 and control chamber 33 are connected by pressure control system 34 including a passageway and control valve 35.

Figure 3:
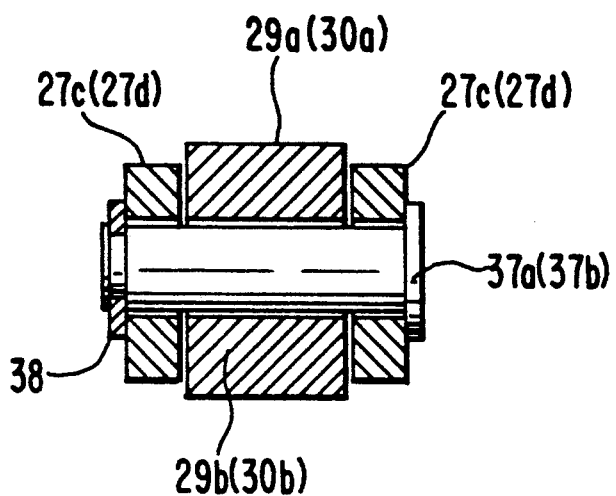
FIG. 3 is an enlarged cross sectional view taken along line 4—4 of FIG. 1.
Figure 4:
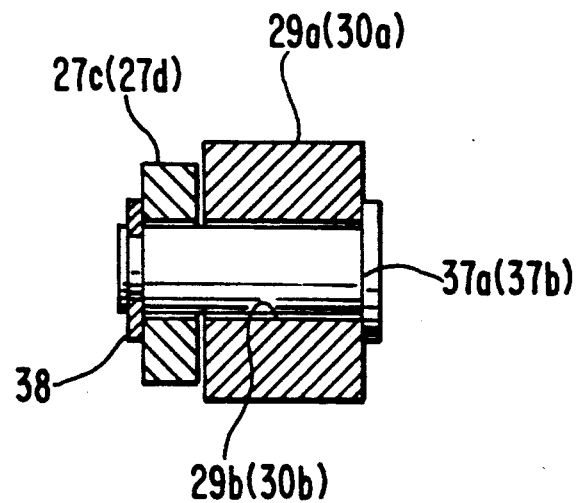
FIG. 4 is enlarged cross sectional view of a prior art hinge coupling mechanism.
Figure 5:
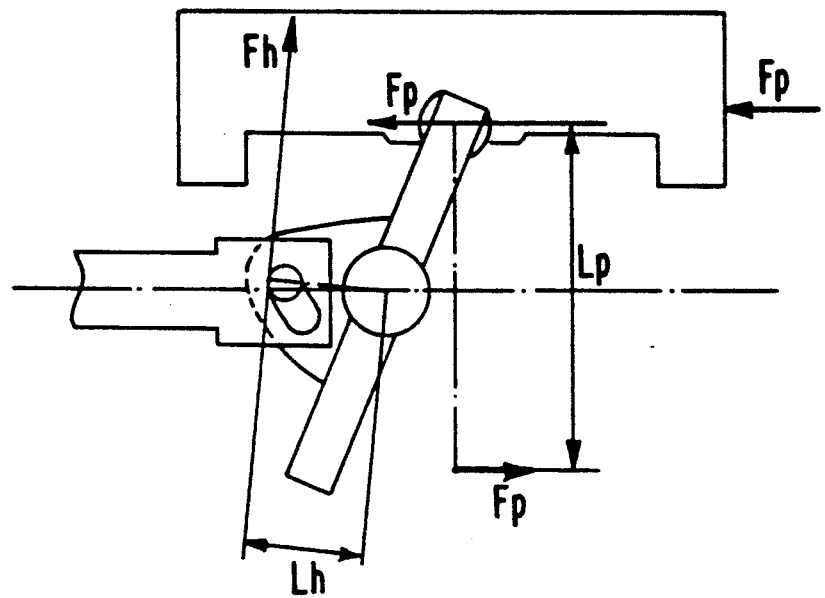
FIG. 5 is an illustrative view of a drive mechanism employing a prior art hinge coupling mechanism.

Referring to FIG. 3, first arm portion 27c of swash plate 27 and second arm portion 27d are symmetrically disposed with respect to the center of swash plate 27. First arm portion 27c is coupled to first arm 29a of second rotor plate 29 and second arm portion 27d is coupled to second arm 30a of first rotor plate 30. First arm portion 27c and second arm portion 27d of swash plate interconnect with first arm portion 29a of second rotor plate 29 and second arm portion 30a of first rotor plate 30 through rectangular holes or slots 29b and 30b by pins 37a and 37b, respectively. Pins 37a and 37b are fixed in position by snap rings 38.

Figure 2:
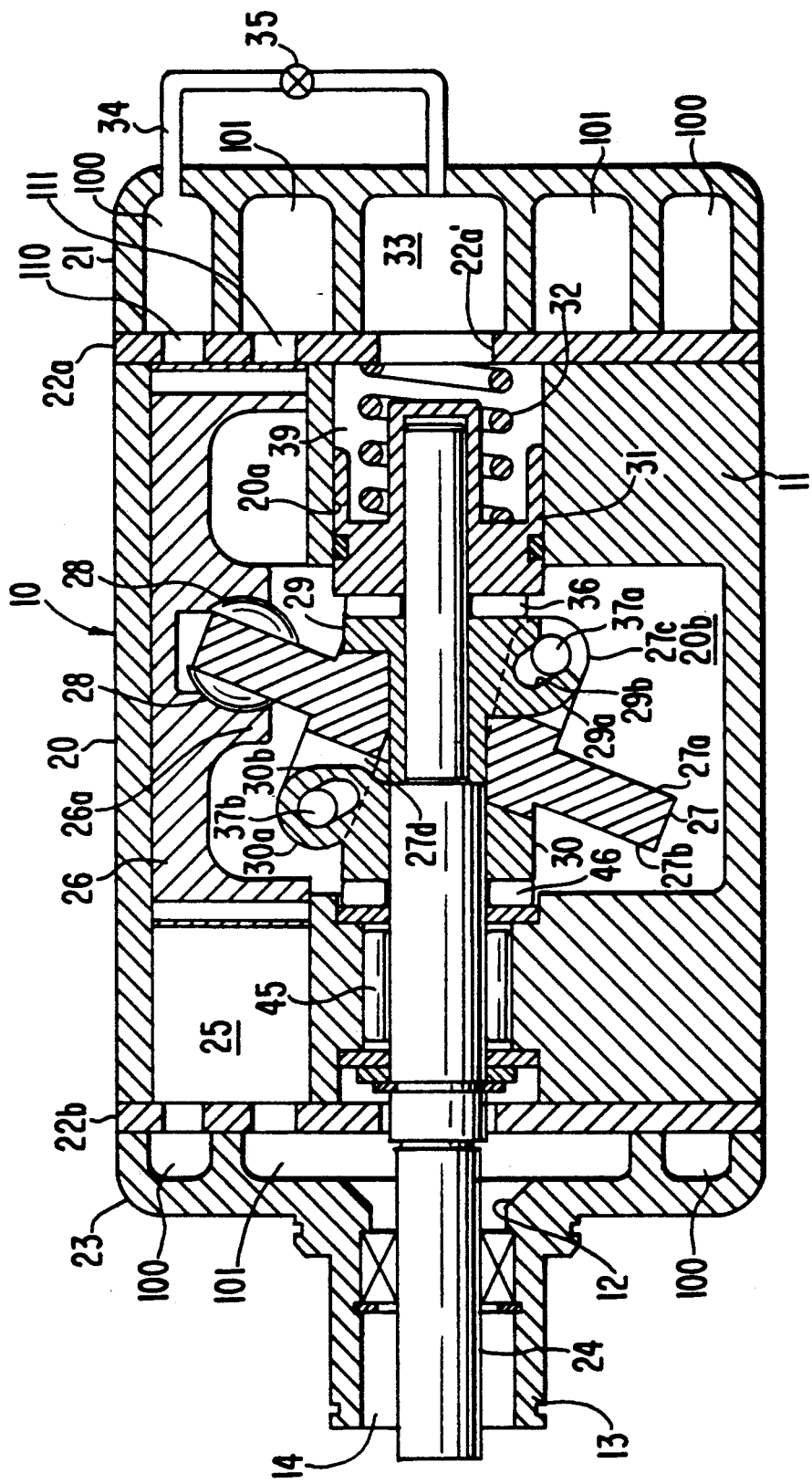
FIG. 2 is a longitudinal sectional view of the swash plate refrigerant compressor of FIG. 1 wherein the swash plate is disposed at a maximum slant or tilt angle.

With such an arrangement, swash plate 27 is capable of shifting between a position where the inclination angle or tilt is large as shown in FIG. 1 and a position where the inclination angle is small as shown in FIG. 2. During shifting of position, pins 37a and 37b of swash plate 27 slide within rectangular holes or slots 29b and 30b.

In operation, as drive shaft 24 is rotated by the engine of a vehicle through a pulley arrangement, first rotor plate 29 and second rotor plate 30 rotate together with drive shaft 24. The rotation of these plates is transferred to swash plate 27 through the two hinge coupling mechanisms. Upon rotation of these rotor plates, the inclined surface of swash plate 27 moves axially to the right and left relative to the pistons and their respective cylinders. Double-headed pistons 26, which are operatively connected to swash plate 27 by bearings 28, reciprocate within cylinders 25. As double-headed pistons 26 reciprocate, the refrigerant gas which is introduced into suction chamber 101 from the fluid inlet port is taken into each cylinder 25 and compressed. The compressed refrigerant is discharged to discharge chamber 100 from each cylinder 25 through discharge port 111 and therefrom into an external fluid circuit, for example a cooling circuit, through the fluid outlet port.

When it is desirable to decrease the refrigerant capacity of the compressor, a tilt control mechanism controls the slant angle or tilt of the slant plate. To decrease refrigerant capacity, the pressure in control chamber 33 is decreased by closing control valve 35. As a consequence, the pressure in crank chamber 20b is greater than the integrated pressure of the control chamber and the recoil strength of coil spring 32. Actuator 31 then frictionally slides toward valve plate 22a as first rotor plate 29 is moved toward actuator 31 by the pressure in crank chamber 20b.

As a result of the above change in relative pressures, pin 37a permits the counterclockwise rotation of first arm 27c of swash plate 27, and the counterclockwise rotation of second arm 27d of swash plate 27 as pin 37b slides downward through groove 30b. As the slant angle of swash plate 27 is minimized relative to the vertical plane, the minimum stroke of double-headed pistons 26 within cylinders 25 occurs.

On the other hand, when it is desirable to increase the refrigerant capacity of a compressor, the pressure in control chamber 33 is increased by opening control valve 35. The integrated force of the pressure in chamber 33 and the recoil of coil spring 32 then is larger than the pressure in crank chamber 20b so that actuator 31 frictionally slides toward swash plate 27 and first rotor plate 29 is moved toward second rotor plate 30. As a result of the above change in relative pressures, pin 37a permits the clockwise rotation of first arm 27c of swash plate 27, and the clockwise rotation of second arm 27d of swash plate 27 as pin 37b slides upward guided by grove 30b. As the slant angle of swash plate 27 is maximized relative to the vertical plane, the maximum stroke of double-headed pistons 26 within cylinders 25 occurs.

Figure 6:
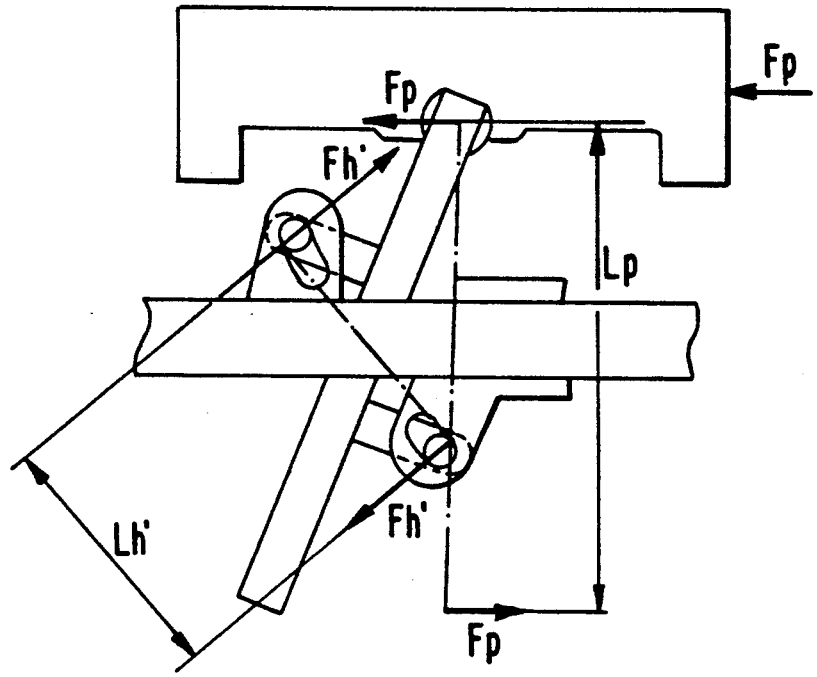
FIG. 6 is an illustrative view of the reaction forces in a drive mechanism of employing a hinge coupling mechanism in accordance with FIG. 1.

Now referring to FIG. 6, the reaction force Fp of piston 26 due to gas compression in cylinder 25 acts against swash plate 27 and is finally applied to the hinge coupling mechanism. The moment caused by the reactive force acting on piston 26 thus acts against the hinge coupling mechanism to cause clockwise rotation at the center of swash plate 27.

If the reaction force from the pistons which occurs during gas compression is Fp', and the distance between the ends of the swash plate is Lp', the moment Mp' caused by the various pistons coupled to the swash plate is the product of force Fp' and distance Lp' as expressed in the following equation:

$$Mp' = Fp \cdot Lp'$$

Also, if the force acting on the two hinge coupling mechanisms and the distance between the first hinge coupling mechanism and the second hinge coupling mechanism are Fh', Lh', respectively, the moment acting on the hinge coupling mechanism is expressed in the following equation:

$$Mh' = Fh' \cdot Lh'$$

Moment Mp' should balance moment Mh' in accordance with the following equations:

$$Fh' \cdot Lh' = Fp \cdot Lp'$$

$$Fh' = Lp'/Lh' \cdot Fp$$

Accordingly, when the double hinge coupling mechanism of the present invention is utilized, the magnitude of force Fh' is small compared with force Fp since the value of distance Lh' is large compared with Lp'. Furthermore, two hinge mechanisms more securely support the swash plate and rotor plate against the large moment caused by reaction forces due to compression from pistons.

Although the present invention has been described in connection with the preferred embodiment, the invention is not limited thereto. It will be easily understood by those of ordinary skill in the art that variations and modifications can be easily made within the scope of this invention as defined by the appended claims.

I claim:

1. A swash plate type compressor comprising:
   a cylinder block having a plurality of cylinders;
   a piston slidably received in each of said cylinders;
   a drive shaft rotatably supported in said cylinder block;
   a swash plate coupled to said pistons and said drive shaft;
   first coupling means for coupling said swash plate to said pistons so that said pistons may be driven in a reciprocating motion within said cylinders upon rotation of said swash plate;
   second coupling means for coupling said swash plate to said drive shaft for rotation therewith, said second coupling means further tilting said swash plate so that said pistons may be driven in a reciprocating motion upon rotation of said swash plate;
   tilt control means coupled to said second coupling means for controlling the tilt of said swash plate by moving at least part of said second coupling means relative to said swash plate;
   first and second hinge mechanisms connected between said second coupling means and said swash plate to permit relative movement therebetween upon actuation of said tilt control means to control the tilt of said swash plate, said first and second hinge mechanisms being disposed on opposite sides of said swash plate.

2. The swash plate type compressor of claim 1 wherein said first and second hinge mechanisms are symmetrically arranged on opposite sides of said swash plate to balance the moment of force received by said first and second hinge mechanisms upon operation of said compressor.

3. The swash plate type compressor of claim 1 wherein said swash plate includes first and second arm portions extending from opposite sides thereof, said second coupling means including third and fourth arm portions on opposite sides of said swash plate, said first and second arm portions being hingedly coupled to said third and fourth arm portions, respectively.

4. The swash plate type compressor of claim 3 wherein said first and second arm portions are hingedly coupled to said third and fourth arm portions, respectively, by a pin and slot mechanism.

5. The swash plate type compressor of claim 4 wherein said second coupling means comprises first and second rotor plates on opposite sides of said swash plate, said first and second rotor plates being connected to said drive shaft for rotation therewith, said third arm portion extending from said first rotor plate and said fourth arm portion extending from said second rotor plate.

6. The swash plate compressor of claim 5 wherein said second rotor plate is coupled to said tilt control means for axial movement along said drive shaft in response to said tilt control means, said second rotor plate interfitting with said swash plate to change the tilt of said swash plate in response to the axial movement of said second rotor plate.

* * * * *